United States Patent
Aronsson et al.

(10) Patent No.: US 9,380,257 B2
(45) Date of Patent: Jun. 28, 2016

(54) PORTABLE ELECTRONIC EQUIPMENT AND METHOD OF RECORDING MEDIA USING A PORTABLE ELECTRONIC EQUIPMENT

(75) Inventors: Pär-Anders Aronsson, Malmo (SE); Håkan Jonsson, Hjarup (SE); David De Leon, Lund (SE); Ola Thörn, Limhamn (SE); Gunnar Klinghult, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 113 days.

(21) Appl. No.: 13/979,910

(22) PCT Filed: Jan. 16, 2012

(86) PCT No.: PCT/EP2012/000170
§ 371 (c)(1),
(2), (4) Date: Aug. 27, 2013

(87) PCT Pub. No.: WO2013/079124
PCT Pub. Date: Jun. 6, 2013

(65) Prior Publication Data
US 2013/0329081 A1  Dec. 12, 2013

Related U.S. Application Data

(60) Provisional application No. 61/564,409, filed on Nov. 29, 2011.

(51) Int. Cl.
*H04N 5/77* (2006.01)
*H04N 1/32* (2006.01)

(52) U.S. Cl.
CPC .............. *H04N 5/772* (2013.01); *H04N 1/32* (2013.01); *H04N 1/32101* (2013.01)

(58) Field of Classification Search
CPC ... H04N 5/772; H04N 2101/00; H04N 5/907; H04N 1/2112; H04N 9/8047
USPC ........................................ 348/231.2
See application file for complete search history.

(56) References Cited

U.S. PATENT DOCUMENTS

| 2006/0082664 A1* | 4/2006 | Yoshida et al. ............ 348/239 |
| 2008/0107361 A1* | 5/2008 | Asukai et al. ............. 382/317 |
| 2012/0120271 A1* | 5/2012 | Park .................. G06K 9/00597 348/222.1 |

FOREIGN PATENT DOCUMENTS

| CN | 1510903 A | 7/2004 |
| EP | 2060231 A2 | 5/2009 |

(Continued)

OTHER PUBLICATIONS
International Search Report, corresponding to PCT/EP2012/000170, date of mailing Feb. 28, 2013.

(Continued)

*Primary Examiner* — Twyler Haskins
*Assistant Examiner* — Fayez Bhuiyan
(74) *Attorney, Agent, or Firm* — Renner, Otto, Boisselle & Sklar LLP.

(57) ABSTRACT

A portable electronic equipment comprises a first sensor to record media and at least one second sensor to capture data representing a physical condition of a user of the portable electronic equipment, the at least one second sensor being configured to capture the data in response to the first sensor recording the media. A processing device is interfaced with the at least one second sensor. The processing device is configured to retrieve the data captured by the at least one second sensor, to generate metadata for the recorded media based on the data, the metadata being indicative of the physical condition, and to cause the metadata to be stored in association with the recorded media.

19 Claims, 6 Drawing Sheets

(56) References Cited

FOREIGN PATENT DOCUMENTS

| | | |
|---|---|---|
| JP | 2004178593 A | 6/2004 |
| JP | 2005222494 A | 8/2005 |
| JP | 3132791 | 5/2007 |
| JP | 2008118527 A | 5/2008 |
| WO | WO 2005/096613 A1 | 10/2005 |

OTHER PUBLICATIONS

Office Action for corresponding Japanese Application No. 2014-543780 dated Aug. 18, 2015.
Chinese Search Report for corresponding application 201280058776.8 dated Aug. 31, 2015.

* cited by examiner

PORTABLE ELECTRONIC EQUIPMENT AND METHOD OF RECORDING MEDIA USING A PORTABLE ELECTRONIC EQUIPMENT

CROSS-REFERENCE TO RELATED APPLICATION

This application claims the benefit of U.S. Provisional Patent Application Ser. No. 61/564,409, filed Nov. 29, 2011, the entire enclosure of which is hereby incorporated by reference.

FIELD OF THE INVENTION

The application relates to a portable electronic equipment and to a method of recording media using a portable electronic equipment. The application relates in particular to such a portable electronic equipment and method which may be used for a portable communication device.

BACKGROUND OF THE INVENTION

A variety of portable electronic equipments nowadays are provided with components for recording images, video or other media. Examples for such electronic equipments include portable communication devices which may include a camera. For illustration, modern mobile telephones or personal digital assistants may be equipped with a camera. Increasing data transmission bandwidths make it increasingly attractive to record media using a portable communication device and to then transfer the recorded media to another device.

With ever increasing popularity of media recording using portable electronic equipments, it is a considerable task to organize the recorded media. Vast amounts of images or videos may be captured using a portable electronic equipment. It may take a significant amount of time to subsequently organize and edit the recorded media.

One approach to aid a user in the task of organizing recorded media consists in transferring the recorded media to a personal computer, and organizing the recorded media in a semi-automated procedure in which a user's response to various media items is evaluated while the media items are output to the user. Such approaches still would require a dedicated processing phase, which may be time consuming.

SUMMARY

There is a continued need in the art for a portable electronic equipment and for a method which address some of the above shortcomings. In particular, there is a continued need in the art for a portable electronic equipment and for a method in which additional information associated with recorded media is generated, which may subsequently be used to group plural recorded media, to search in plural recorded media, or to otherwise aid the user in organizing recorded media.

According to an embodiment, a portable electronic equipment is provided. The portable electronic equipment comprises a first sensor to record media. The portable electronic equipment comprises at least one second sensor to capture data representing a physical condition of a user of the portable electronic equipment, the at least one second sensor being configured to capture the data in response to the first sensor recording the media. The portable electronic equipment comprises a processing device interfaced with the at least one second sensor. The processing device is configured to retrieve the data captured by the at least one second sensor, to generate metadata for the recorded media based on the data, the metadata being indicative of the physical condition, and to cause the metadata to be stored in association with the recorded media.

The at least one second sensor may be configured to capture the data while the first sensor simultaneously records the media.

The processing device may be configured to verify whether the captured data fulfill a pre-determined criterion, and to cause the metadata to be stored selectively based on whether the captured data fulfill the pre-determined criterion.

The pre-determined criterion may comprise at least one threshold comparison.

The at least one second sensor may be configured to capture first data representing a first physical condition and second data representing a second physical condition different from the first physical condition. The processing device may be configured to perform a first threshold comparison for the first data, to perform a second threshold comparison for the second data, and to selectively generate the metadata based on a result of both the first threshold comparison and the second threshold comparison.

The portable electronic equipment may comprise a storage device configured to store the recorded media and the associated metadata. The processing device may be configured to process media stored in the storage device based on the metadata respectively associated with the media.

The processing device may be configured to perform a search in the media stored in the storage device based on the metadata associated with the media.

The processing device may be configured to organize the media stored in the storage device into plural groups based on the metadata associated with the media.

The processing device may be configured to evaluate criteria to organize the media stored in the storage device into plural groups based on the associated metadata. The criteria may change over time. The criteria may be adjusted automatically. The processing device may be configured to correlate metadata associated with plural media items which are respectively grouped together by a user input, in order to adjust the criteria.

The metadata associated with the media may comprise first metadata indicative of a first physical condition and second metadata indicative of a second physical condition different from the first physical condition. The processing device may be configured to process the media stored in the storage device based on both the first metadata and the second metadata respectively associated with the media.

The first sensor may comprise an image sensor.

The image sensor may be configured to record a video which comprises a plurality of image frames. The at least one second sensor may be configured to capture the data while the plurality of image frames are recorded.

The processing device may be configured to cause the metadata to be stored selectively for a subset of the plurality of image frames based on the data captured while the plurality of image frames are recorded.

The portable electronic equipment may comprise a wireless communication circuit interfacing the processing device and a second sensor of the at least one second sensor.

The at least one second sensor may comprise an image sensor configured to capture the user's body language, e.g., the user's facial expression. The processing device may be configured to analyze the user's body language. Alternatively or additionally, the at least one second sensor may comprise a device for measuring a galvanic skin response. Alternatively or additionally, the at least one second sensor may comprise a heart rate monitor for measuring a pulse rate of the user. Alternatively or additionally, the at least one second sensor may comprise a device for measuring a blood oxygen saturation. The device for measuring the oxygen saturation may be a pulse oximeter. Alternatively or additionally, the at least one second sensor may comprise a device for recording the user's brain activity. Various combinations of such second sensors may be used, and other second sensor(s) configured to capture data representing a physical condition of the user may be used additionally or alternatively.

A plurality of second sensors may be used.

The processing device may be configured to generate the metadata for the recorded media by causing raw data retrieved from one or plural second sensor(s) to be stored as metadata indicative of the physical condition of the user. Alternatively or additionally, the processing device may evaluate a function or plural functions which depend(s) on the data retrieved from the one or plural second sensor(s), to generate the metadata. In this case, the processing device generates manipulated sensor data by processing the raw data and causes the manipulated sensor data to be stored. Alternatively or additionally, the processing device may cause a combination of raw sensor data retrieved from the second sensor(s) and manipulated sensor data obtained by processing the raw data to be stored as metadata.

According to an embodiment, a method of recording media using a portable electronic equipment is provided. The method comprises recording the media. Data representing a physical condition of a user of the portable electronic equipment are captured when the media are recorded. Metadata for the recorded media are generated based on the captured data, the metadata being indicative of the physical condition. The metadata are stored in association with the recorded media.

The media may be recorded using a first sensor, and the data may be captured using at least one second sensor which is different from the first sensor.

The data may be captured while the first sensor simultaneously records the media.

The at least one second sensor may be configured to capture the data while the first sensor simultaneously records the media.

The metadata may be stored selectively based on whether the captured data fulfill a pre-determined criterion. The pre-determined criterion may comprise at least one threshold comparison. First data representing a first physical condition and second data representing a second physical condition different from the first physical condition may be captured. A first threshold comparison may be performed for the first data, a second threshold comparison may be performed for the second data, and the metadata may be generated selectively based on a result of both the first threshold comparison and the second threshold comparison. Various logical operators may be applied to determine whether the metadata are to be generated and stored. For example, a logical "AND", a logical "OR", or a logical "XOR" operator may be applied to the results of the first and second threshold comparisons, to selectively generate the metadata based on the results of the first and second threshold comparisons.

The portable electronic equipment may comprise a storage in which the recorded media and the associated metadata are stored. Media stored in the storage device may be processed based on the metadata respectively associated with the media.

A search in the media stored in the storage device may be performed based on the metadata associated with the media. Alternatively or additionally, the media stored in the storage device may be assigned to plural different groups based on the metadata associated with the media.

The metadata associated with the media may comprise first metadata indicative of a first physical condition and second metadata indicative of a second physical condition different from the first physical condition. The media stored in the storage device may be processed based on both the first metadata and the second metadata respectively associated with the media. Various logical operators may be applied to determine whether media are associated with metadata that correspond to certain combinations of physical conditions. For example, a logical "AND", a logical "OR", or a logical "XOR" operator may be applied to the results of first and second threshold comparisons performed for the first and second metadata, respectively.

The recorded media may comprise at least one image.

The recorded media may comprise a video having a plurality of image frames. The data representing the physical condition may be captured while the plurality of image frames is recorded. The data representing the physical condition may be recorded continuously or quasi-continuously at plural times during the ongoing video recording. The metadata may be stored selectively for a subset of the plurality of image frames of the video, based on the data that are captured while the plurality of image frames are recorded.

At least some of the data representing a physical condition of the user may be transmitted over a wireless interface. A processing device which generates the metadata may read out at least one second sensor over a wireless connection, to retrieve the captured data.

The data representing the physical condition of the user may include an image of the user's body language, e.g., the user's facial expression. Alternatively or additionally, the data representing the physical condition of the user may comprise a galvanic skin response. Alternatively or additionally, the data representing the physical condition of the user may comprise a pulse rate of the user. Alternatively or additionally, the data representing the physical condition of the user may comprise a blood oxygen saturation. Various combinations of such data representing the physical condition may be used, and other indicators for the physical condition may be used additionally or alternatively.

A plurality of second sensors may be used to capture the data representing the physical condition.

The method may be performed by the portable electronic equipment of any aspect or embodiment.

According to yet another embodiment, there is provided a non-transitory storage medium storing instruction code which, when executed by a processor of a portable electronic equipment, directs the portable electronic equipment to perform the method of any one aspect or embodiment.

According to another embodiment of the invention, a method of processing images is provided. Metadata is associated with each image, the metadata being indicative of a user's physical condition at a time at which the respective image was recorded. The method comprises retrieving the metadata associated with an image, and processing the image based on the respectively associated metadata. The processing may include searching for an image based on the metadata. The processing may alternatively or additionally include assigning the image to one of a plurality of groups, based on the metadata associated with the image.

The portable electronic equipments and methods of various embodiments allow metadata to be generated which are indicative of a user's physical condition at a time at which the respective media was recorded. Media may be automatically tagged with personal sensor information. The personal sensor information may be tagged to an image, to a video sequence, or to respectively individual image frames of an image sequence. Such automatically generated tags may be used when the media are to be organized, when a search is to be performed in the media, or when other post-processing is to be performed. The tags are added automatically while the media is recorded. It is not required to perform a separate post-processing to add indicators for the physical condition at a later stage.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and advantages of the invention will become apparent from the following detailed description when read in conjunction with the accompanying drawings, in which like reference numerals refer to like elements.

DETAILED DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. A coupling between components may also be established over a wireless connection. Functional blocks may be implemented in hardware, firmware, software or a combination thereof.

The features of the various embodiments may be combined with each other, unless specifically noted otherwise.

Portable electronic equipments and methods of recording media using a portable electronic equipment will be described. The portable electronic equipment has a first sensor configured to record media. The first sensor may include an image sensor configured to capture an image, or a series of image frames forming a video sequence. Data representing a physical condition of the user are determined when the image sensor records an image by converting an optical image into image data. The captured data, which is also referred to as "personal sensor information" herein relates to the physical condition of the user at the time at which the image capture is performed. The captured data, or other data generated therefrom, is stored so that it is associated with the recorded media.

As will be explained in more detail below, the portable electronic equipments and methods of embodiments automatically add personal sensor information to images or other media, thereby facilitating subsequent processing. While it may be sufficient to monitor one physical condition of a user, plural different data which represent plural different physical conditions may be captured simultaneously with the recording of the image or other media. Metadata for the media may be generated based on the data which represent plural different physical conditions. For illustration, at least one of a facial expression, a pulse rate, a galvanic skin response, or a blood oxygen saturation may be captured. The captured data may be processed to generate the metadata. The user's facial expression may be subjected to image processing to determine a numerical value which quantifies different degrees of smiling, and the numerical value may be stored as metadata associated with recorded media. Other sensor data, such as the pulse rate, the galvanic skin response, or the blood oxygen saturation, may be stored directly as metadata. Data indicative of different physical conditions at the time at which the media was recorded may be captured in parallel, and may be used to generate metadata indicative of the user's physical condition. For illustration, the metadata may include a value indicating the pulse rate and another value indicating the blood oxygen saturation. These two values in combination may be used to identify physical strain conditions, for example. Other data may be captured while the media is being recorded, and may be processed to add this personal information to an image file as a tag, for example. At least a fraction of the data representing a physical condition of the user may relate to conditions of the user which are visible, such as body language. At least a fraction of the data representing a physical condition of the user may relate to conditions such as brain activity, electrical voltages or currents, or electrical resistance(s) which are not visible.

Figure 1:
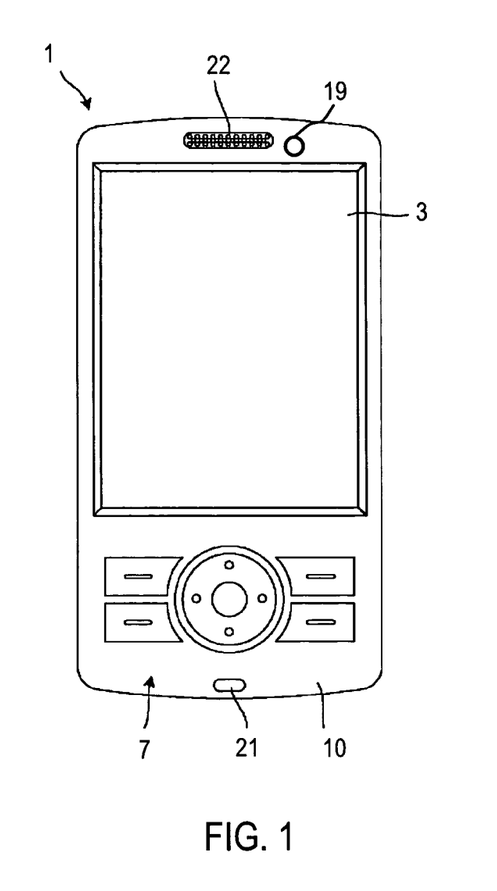
FIG. 1 is a front view of a portable electronic equipment according to an embodiment.
Figure 2:
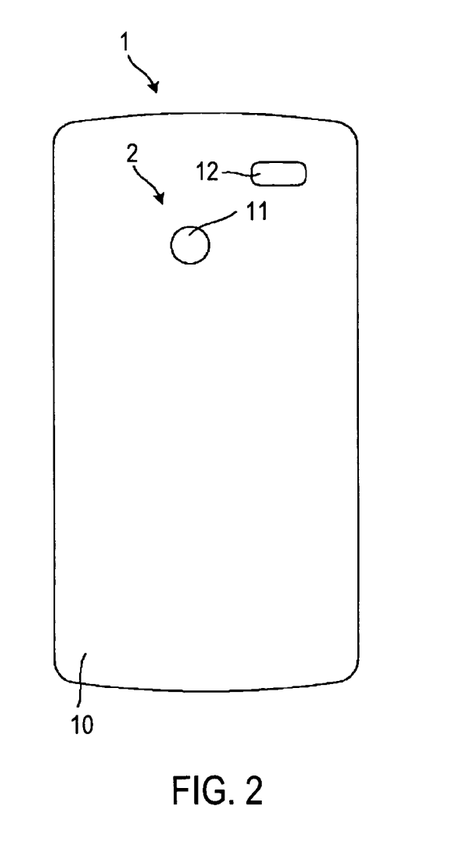
FIG. 2 is a rear view of the portable electronic equipment.
Figure 3:
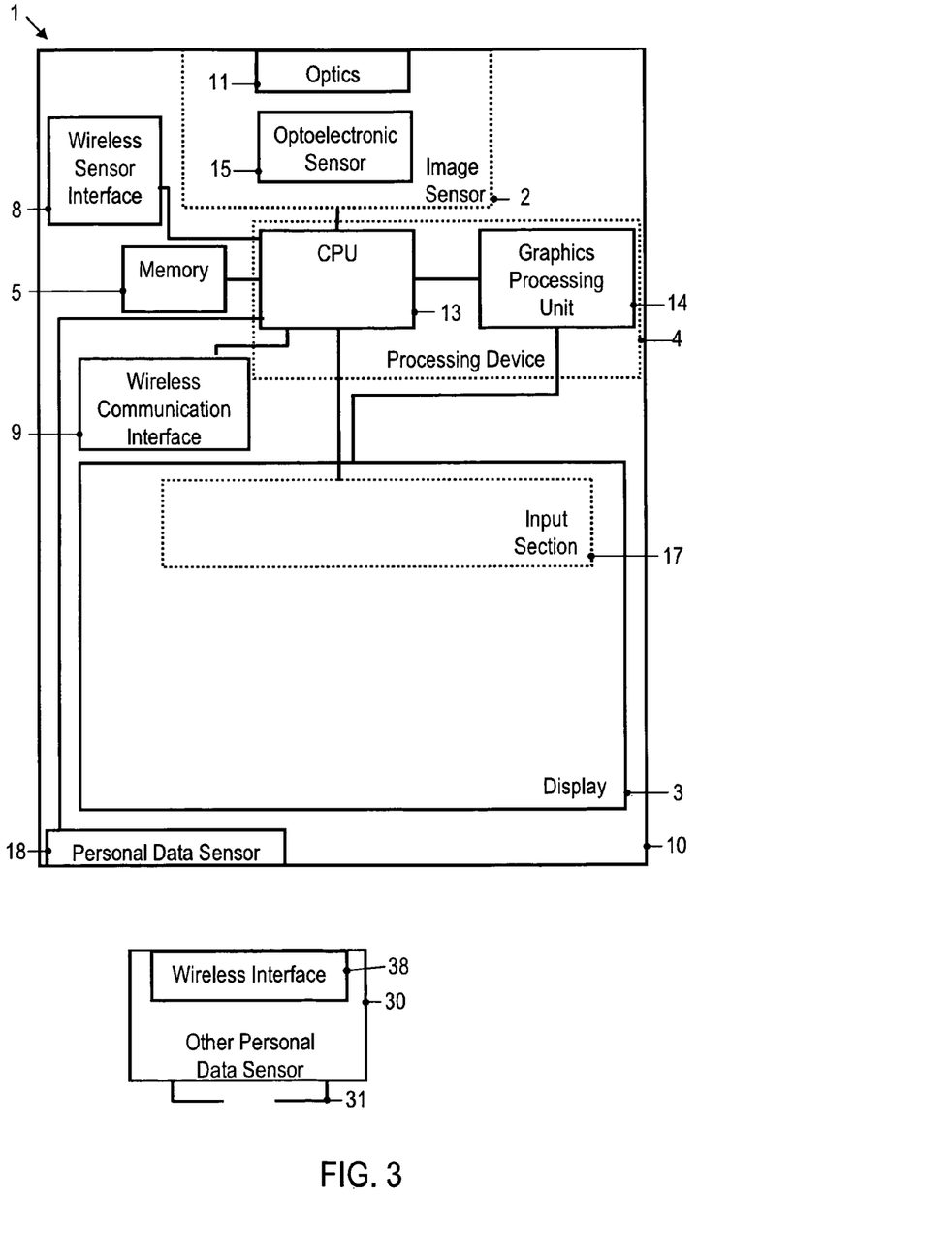
FIG. 3 is a schematic block diagram of the portable electronic equipment of FIGS. 1 and 2.

FIG. 1 is a front view of a portable electronic equipment 1, FIG. 2 is a rear view of the portable electronic equipment 1, and FIG. 3 is a schematic block diagram representation of the portable electronic equipment 1. The portable electronic equipment 1 includes a main image sensor 2, a display 3 and a processing device 4. The processing device 4 may be one processor or may include plural processors, such as a main processor 13 and a graphics processing unit 14. The main image sensor 2 of the portable electronic equipment 1 may include various components of a digital camera. The main image sensor 2 may include a focusing optics 11. The main image sensor 2 includes an optoelectronic sensor 15 which performs image sampling, to convert an optical image into image data. The main image sensor 2 may include additional components, such as a flashing unit 12, an illumination sensor, or similar. The main image sensor 2 serves as a first sensor configured to record an image or a series of image frames.

The portable electronic equipment 1 has at least one second sensor which captures data representing a physical condition of a user of the portable electronic equipment 1. As will be described in more detail below, the at least one second sensor may have a variety of configurations and may sense a variety of different types of data which represent physical conditions of the user. The at least one second sensor is different from the first sensor that is used for recording media.

The processing device 4 may perform processing and control operations. When an image is to be recorded with the main image sensor 2, the processing device 4 may retrieve the data captured by the at least one second sensor. The processing device 4 may generate metadata associated with the image, the metadata being generated based on the data captured by the at least one second sensor. The metadata may be generated such that the metadata includes the captured data which the processing device 4 reads from a second sensor. The metadata may also be generated such that the processing device 4 performs additional processing. For illustration, if the at least one second sensor includes a second image sensor 19 which captures a photo of the user's body language at the time at which the main image sensor 2 records an image or video, the processing device 4 may perform image processing of the photo of the user's body which was captured by the second image sensor 19. The processing device 4 may derive a numerical value by processing the photo of the user's body captured by the second image sensor 19. A curvature of the user's mouth may be quantified, for example, to thereby serve as an indicator for a degree of smiling.

The processing device 4 is configured such that it generates the metadata using the data captured by the second sensor(s) when media were recorded. The data representing the physical condition therefore represent the user's physical condition at the time of recording the media. This facilitates automated processing of recorded media. The recorded media may be organized, searched or filtered according to the user's physical conditions at the time of recording the media. As the tag indicating the user's personal information is added at the time of creation of a media file, it is not required to perform a separate post-processing to add such information to media files. As will be described in more detail, the data indicative of the physical condition may have any one of a variety of formats. For illustration, the data may be such that at least one of a state of happiness, of excitement, of heavy workload and/or other physical states may be identified based on the data captured by the second sensor(s).

The processing device 4 is configured such that the data captured by the second sensor(s) is retrieved in coordination with the recording of media. The recording of media may trigger the processing device 4 to retrieve data captured by the second sensor(s). The processing device 4 may retrieve the data which were captured by the second sensor(s) while the recording of the media was still in process. The processing device 4 may actively query at least one second sensor(s) at the time at which the main image sensor 2 captures an image, to retrieve the data representing the user's physical condition. If the main image sensor 2 captures a video having plural image frames, the processing device 4 may actively query at least one second sensor(s) plural times during the recording. The timing at which the processing device 4 retrieves the data captured by the second sensor(s) during video recording may be matched to the frame rate at which image frames of the video sequence are recorded. It is not required that the data indicative of the physical condition are retrieved for each image frame. The processing device 4 may retrieve the data from the second sensor(s) only for a subset of the image frames of a recorded video, e.g., for every $n^{th}$ frame, with n being an integer greater than one.

Other techniques may be used to coordinate the generation of the metadata with the media recording, so as to ensure that the metadata indicate the user's physical condition at the time of media recording. For illustration, the second sensor(s) may monitor the user's physical condition continuously or quasi-continuously. The processing device 4 may be configured to select those data captured by the second sensor(s) which correspond to the time at which media recording was being performed. Time stamps may be used by the second sensor(s), which assist the processing device 4 in identifying the data which were captured by the second sensor(s) at the same time at which media recording was performed. The processing device 4 does not need to retrieve the data representing the user's physical condition at the same time at which the media recording is being performed, as long as it is possible to identify the data which were captured when media recording was performed.

The processing device 4 may perform any one of a variety of functions to generate the metadata. The processing device 4 may generate the metadata for recorded media such that the metadata includes one or several value(s) retrieved from the second sensor(s), which represent the sensor reading at the time of media recording. An identifier may additionally be stored in the metadata to respectively associate each value retrieved from a second sensor with a particular physical condition. For illustration, the processing device 4 may generate the metadata such that they include a value retrieved from a heart rate sensor, in combination with an identifier which identifies the value as being a pulse rate. The processing device 4 may generate the metadata such that they include a value retrieved from an oximeter, in combination with an identifier which identifies the value as being a blood oxygen saturation and/or pulse rate. The processing device 4 may generate the metadata such that they include a value retrieved from a device for measuring a galvanic skin response, in combination with an identifier which identifies the value as being a galvanic skin response. Other identifiers may be used, depending on the second sensor(s) which are available for capturing the data representing the physical condition of the user.

While the processing device 4 may cause raw data retrieved from one or plural second sensor(s) to be stored as metadata, the processing device 4 may perform additional processing when generating the metadata. The processing device 4 may generate manipulated sensor data by evaluating a function which depends on the raw data retrieved from one or plural second sensor(s). The processing device 4 may evaluate a mathematical function which depends on the raw data retrieved from one or plural second sensor(s) to generate the metadata. The metadata may also be generated such that the metadata include a combination of raw data retrieved from one or plural second sensor(s) and of manipulated data obtained by inputting the raw data to one or plural functions.

For illustration, the processing device 4 may perform image recognition on an image of the user's face captured by the second image sensor 19. The processing device 4 may compute a numerical value by analyzing the image of the user's face captured by the second image sensor 19, to determine a numerical quantity indicative of the user's physical condition. For illustration, the processing device 19 may determine an angle between two lines which connect the outer edges of the mouth to the lowest portion of the mouth, thereby quantifying a degree of smiling in the user's facial expression. Other quantifiers for body language may be used. A result of the processing performed by the processing device 4 may be stored in the metadata associated with the image or video captured by the main image sensor 2.

The processing device 4 may perform logical operations on the data provided by different second sensors. For illustration, data of a second sensor which represent a physical condition may be compared to a threshold. If more than one characteristic quantity defining the physical conditions is captured by the second sensor(s), the processing device 4 may use logical operations to combine the outputs of the second sensor(s). This may be done when generating the metadata and/or when subsequently evaluating metadata generated for recorded media. For illustration, first and second data provided by different second sensors may each be compared to a threshold, and a logical operator may be applied to a result of the both threshold comparisons. The processing device 4 may identify states in which, for example, the pulse rate is above a first threshold, and the galvanic skin response is above a second threshold, and the blood oxygen saturation is below a third threshold. Such physical conditions, identified by evaluating the data captured by plural second sensors during media recording, may be indicative of the user being in a state of high tension. The processing device 4 may also identify situations in which, for example, the pulse rate is above a first threshold, and the galvanic skin response is above a second threshold, and the blood oxygen saturation is above a fourth threshold. Such physical conditions, identified by evaluating the data captured by plural second sensors during media recording, may be indicative of the user being in a state of high effort. The processing device 4 may also identify situations in which, for example, the pulse rate is above a first threshold, and the blood oxygen concentration is above a third threshold.

If the processing device 4 performs logical operations or other processing on the data captured by the at least one second sensor, the metadata may be generated based on a result of the logical operations or other processing. The processing device 4 generates the metadata based on the data provided by second sensor(s) such that the metadata represents the user's physical condition at the time of media recording. The processing device 4 causes the metadata to be stored in association with the recorded media. The metadata may be stored in a media file of the media with which it is associated. In other implementations, the metadata may be stored in a file separate from the media file, but in a manner which allows a one-to-one correspondence to be established between metadata and media file.

The processing device 4 may cause the metadata and media file to be stored locally in the portable electronic equipment, e.g. in a non-volatile memory 5 or other storage device. When the user activates a setting to allow data indicative of the physical condition to be shared, the processing device 4 may communicate some of the media files and associated metadata stored in the memory 5 over a wireless communication interface 9. For illustration, when a user wishes to transmit a certain media file, the processing device 4 may retrieve the associated metadata and may communicate this information to a server over the wireless communication interface 9, if the user has activated a setting which permits the transmission of personal data. The processing device 4 may retrieve the metadata from the memory 5 also for other purposes, such as searching, grouping of media files, or filtering media files according to filter criteria.

The second sensor(s) may have various configurations. For illustration, the second image sensor 19 pointing towards the user during image capture may be used to determine the user's body language. The second image sensor 19 is integrated into a housing 10 of a portable electronic device which also includes the processing device 4 and the main image sensor 2. There may be other second sensor(s) which are integrated into the portable electronic device. For illustration, a personal data sensor 18 may be provided to measure a galvanic skin response or another quantity characteristic of the user's physical condition when media are being recorded. The personal data sensor 18 acts as a second sensor that captures data representing the user's physical condition at the time of media recording. The personal data sensor 18 is integrated in the portable electronic device. The personal data sensor 18 may have sections which are exposed at the exterior of the housing 10.

Another personal data sensor 30 may be provided separately from the portable electronic device. The other personal data sensor 30 acts as a second sensor that captures data representing the user's physical condition at the time of media recording. The other personal data sensor 30 may have a mount 31 for attachment to the user's body. The other personal data sensor 30 may be mounted to an ear, to a finger, or another portion of the user's skin. The other personal data sensor 30 may be configured as a pulse oximeter measuring the user's pulse rate and blood oxygen concentration. The other personal data sensor 30 may be configured as a heart rate monitor measuring the user's pulse rate. The other personal data sensor 30 may be configured as a device for monitoring the user's brain activity. The other personal data sensor 30 may be interfaced with the processing device 4 over a wireless connection. The other personal data sensor 30 may have a wireless interface 38 for communication with a wireless sensor interface 8 of the portable electronic device. The wireless interface 38 and the wireless sensor interface 8 may be configured for near field communication. The wireless interface 38 and the wireless sensor interface 8 may be configured for communication using a protocol of the IEEE 802.11 protocol family. For illustration rather than limitation, the wireless interface 38 and the wireless sensor interface 8 may be configured for communication using the Bluetooth Health Device Profile (HDP). Communication between the wireless interface 38 and the wireless sensor interface 8 may be performed according to the IEEE 11073 optimized exchange protocol, for example, or other protocols for communication between health-related sensors and other devices.

The portable electronic equipment 1 may be operative as a portable communication device, e.g. a cellular telephone, a personal digital assistant, or similar. The portable electronic equipment 1 may include components for voice communication, which may include a microphone 21, a speaker 22, and the wireless communication interface 9 for communication with a wireless communication network. The portable electronic equipment 1 may have a manually operable user interface. The user interface may include function and control keys 7 provided on the housing 10 of the portable electronic equipment, and/or a touch- or proximity-sensitive input section 17 of the display 3.

With reference to FIG. 4 to FIG. 9, the operation of the portable electronic equipment 1 will be explained in more detail.

An image or a series of images captured by the main image sensor 2 of the portable electronic device 1 may be stored in the non-volatile memory 5 or another storage device. Associated metadata indicative of the user's physical condition during media recording may be stored for at least some of the images. The metadata indicative of the user's physical condition may be stored in the same file as the image or video, e.g. as an attribute, or may be stored in a separate file.

When a video including plural image frames is recorded, data indicative of the user's physical condition may be captured for several frames, and metadata may be generated and stored so as to be associated with individual image frames of the vide sequence. This facilitates the search for certain image frames, using the user's physical condition as search criterion.

Figure 4:
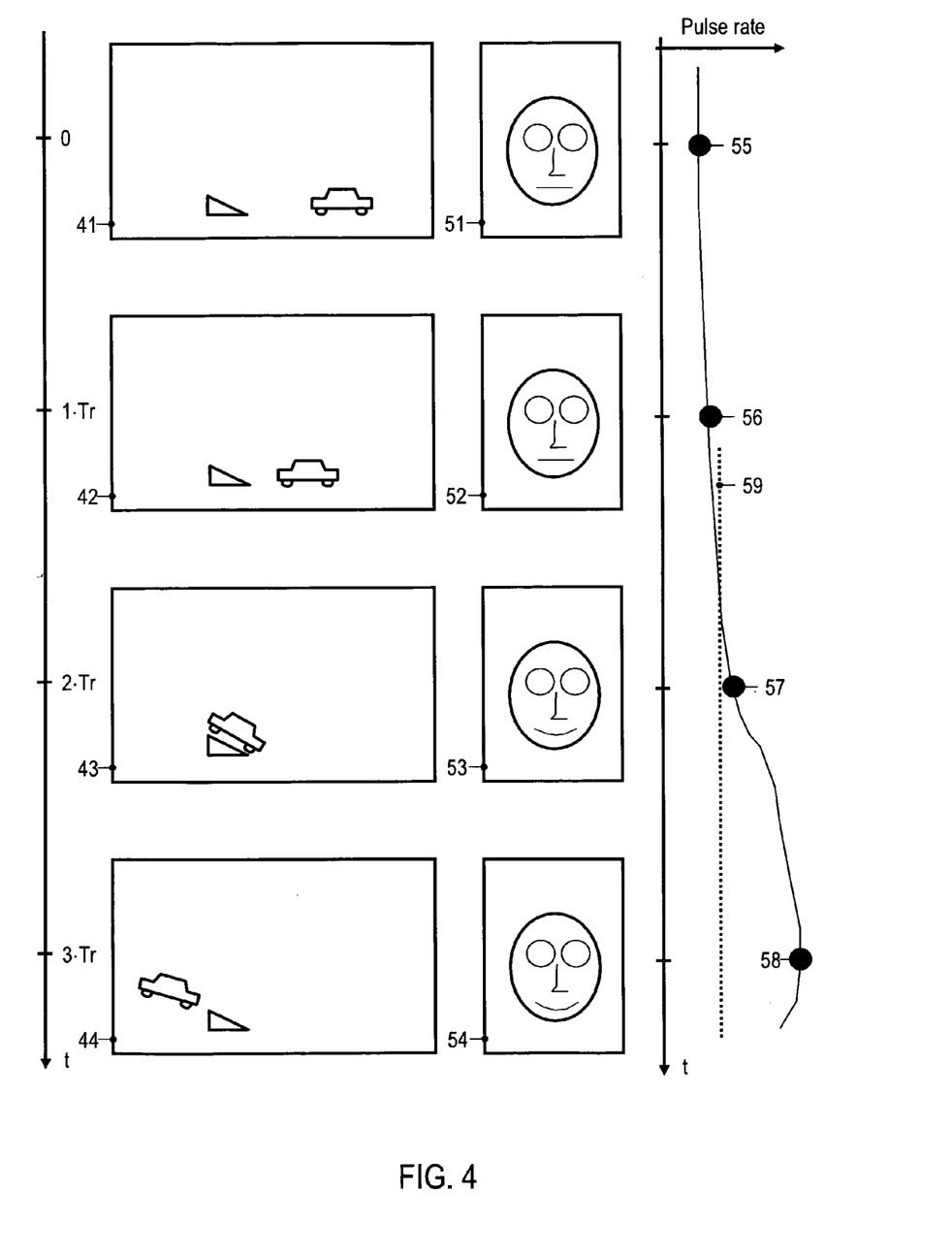
FIG. 4 is a view illustrating operation of a portable electronic equipment according to an embodiment.

FIG. 4 is a schematic representation illustrating the data captured with various sensors of the portable electronic equipment 1 of FIGS. 1 to 3. In the illustrated operation, a video is recorded using the main image sensor 2 to capture a plurality of image frames 41-44. The images are captured at a frame interval Tr.

Using the second image sensor 19 facing towards the user, images 51-54 of the user's body language are captured. The images 51-54 may be evaluated, in order to determine a numerical value which quantifies the body language. For illustration, image analysis may be performed to detect a user's face and to quantify a degree of smiling.

Using another second sensor, such as a pulse oximeter or a heart rate monitor, the user's pulse rate may be monitored during recording of the video.

The images 51-54 may be captured when respectively an image frame of the video is recorded. The second image sensor 19 may be operated in a video mode, to record the user's facial expression while video recording is simultaneously performed using the main image sensor 2. Similarly, pulse rate values 55-58 may be read out when respectively an image frame of the video is recorded. While the data captured by the second sensor(s) may also be captured and evaluated at the frame interval Tr, the rate for capturing data representing the user's physical condition may be different from the rate at which the image frames 41-44 are captured. For illustration, the images 51-54 captured using the second image sensor may be captured at an interval K·Tr which is longer than the frame interval Tr, with k being an integer greater than one. The pulse rate values 55-58 may be read out at an interval m·Tr which is longer than the frame interval Tr, with m being an integer greater than one.

Metadata may be generated for at least some of the image frames of the video sequence. The metadata may be generated and stored selectively only for a subset of the image frames which form the video sequence. For illustration, metadata may only be generated for every $n^{th}$ image frame, with n being an integer greater than one.

Alternatively or additionally, the metadata may be stored selectively for image frames based on an evaluation of the captured data. For this purpose, the data provided by a second sensor may be compared to a threshold 59. Based on a result of the comparison, the metadata may be selectively stored. Thereby, metadata may be selectively generated and stored for those media for which the physical condition of the user shows a certain response, reflected by the captured data exceeding a certain threshold or falling below another certain threshold. Storage space requirements may be reduced when the metadata is selectively stored. If there is more than one second sensor, the process of selectively storing metadata for recorded media may be performed using a logical operations on the data captured by plural second sensors. The data provided by different second sensors may respectively be subjected to a threshold comparison, and logical operators may be applied to the results of the threshold comparisons. For illustration, a logical AND, OR, or XOR-operation may be performed on the result of a first threshold comparison performed for the pulse rate and a second threshold comparison performed for the blood oxygen level. This allows metadata to be generated selectively when at least one of the different values representing the user's physical condition shows a significant deviation from a default value.

The threshold(s) may be adjusted based on the data captured by the second sensor(s) during plural media recording processes. Thereby, account may be taken of the fact that characteristics of the user's physical condition may vary from one user to another user. E.g., the pulse rate at rest may vary from one user to another. By adjusting threshold(s) which are used in generating metadata and/or in processing of recorded media based on the metadata, a portable electronic equipment capable of automatically learning about its user may be realized which uses previously captured data to adjust the threshold(s).

Figure 5:
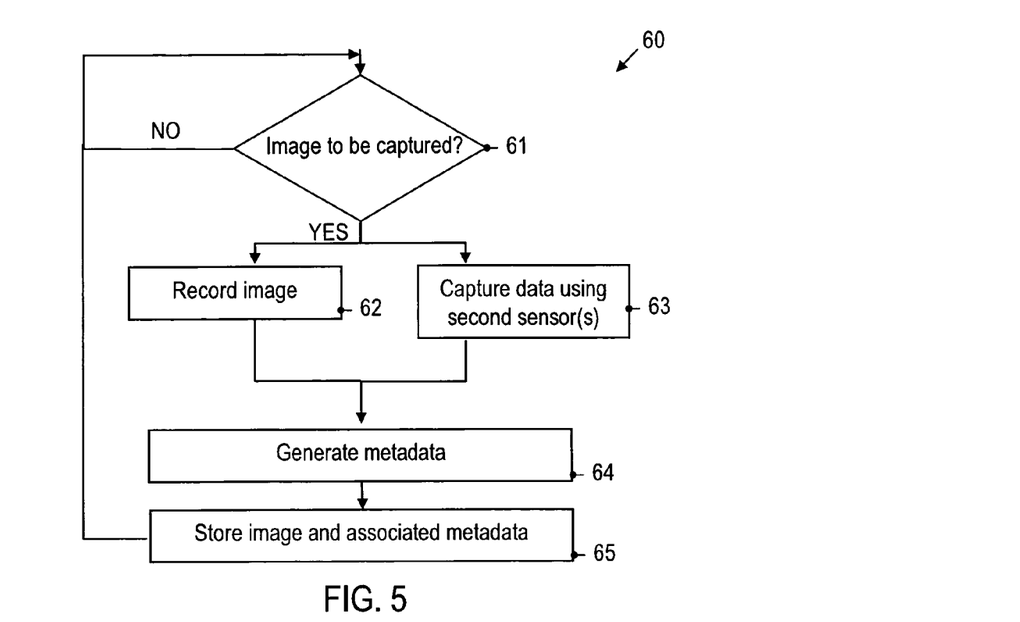
FIG. 5 is a flow chart of a method according to an embodiment.

FIG. 5 is a flow chart of a method 60. The method 60 may be performed by the portable electronic equipment 1 of FIGS. 1 to 3. For illustration rather than limitation, the method 60 will be explained in the context of image recording.

At 61, it is determined whether an image is to be captured. The determining may include monitoring an input interface of the portable electronic equipment. If no image is to be captured, the monitoring is continued at 61.

If an image is to be captured, image recording is performed at 62 and data representing a physical condition of the user are captured at 63. Capturing the data is performed in response to the image recording, i.e. in coordination with the image recording. The image recording and the capturing of data representing the physical condition may be performed with a temporal overlap. If the image recording is performed throughout a first period, and the capturing of the data representing the physical condition of the user is performed throughout a second period, the second period may at least partially overlap with the first period. The second period may be fully contained in the first period, or the first period may be fully contained in the second period.

At 64, metadata are generated based on the data representing the physical condition of the user. To generate the metadata, numerical value(s) output by a second sensor may be written into the metadata. If the second sensor provides data which include a numerical value indicative of a pulse rate, blood oxygen saturation, or galvanic skin response, this value may be written into the metadata. Additional processing may be performed to generate the metadata. As already explained with reference to FIGS. 1 to 4, image analysis, threshold comparisons, and/or logical operations may be performed on the data captured by second sensor(s) to generate the metadata.

At 65, the image file and associated metadata are stored. The metadata may be included in the image file. The metadata may be included in an attribute field of the image file or may otherwise be tagged to the image. The metadata may also be stored in a separate file such that a one-to-one correspondence may be established between metadata and image file. The method returns to the monitoring at 61.

The generation and storing of metadata may be performed selectively when the data captured by the second sensor(s) fulfills a pre-defined criterion. A threshold comparison may be performed to determine whether data representing the physical condition during image capture should be converted to metadata associated with the image file.

Figure 6:
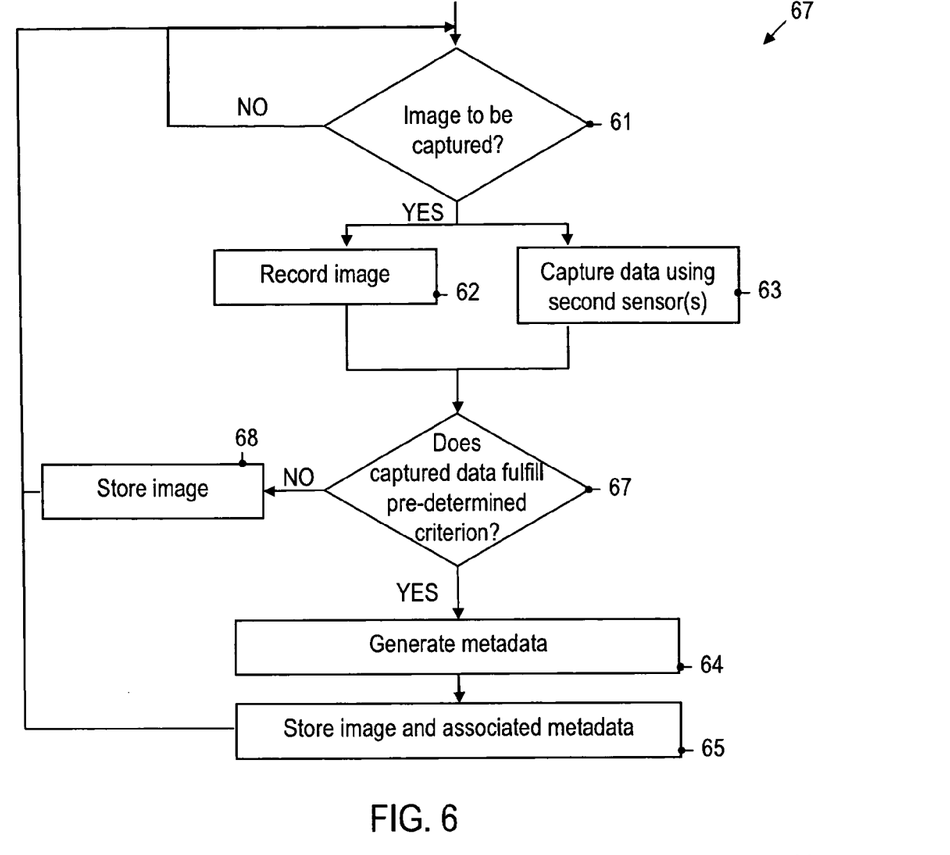
FIG. 6 is a flow chart of a method according to an embodiment.

FIG. 6 is a flow chart of a method 67 in which metadata is selectively stored. The method 67 may be performed by the portable electronic equipment 1 of FIGS. 1 to 3. For illustration rather than limitation, the method 67 will be explained in the context of image recording. Steps which are designated with the same reference numerals as in FIG. 5 may be performed in the same way as explained with reference to FIG. 5.

At 61, it is determined whether an image is to be captured. If an image is to be captured, at 62 image recording is performed. Additionally, at 63 data representing the physical condition of the user are captured.

At 67, the captured data is evaluated to determine whether the captured data fulfills a pre-determined criterion. The captured data may be subjected to a threshold comparison. For illustration, a pulse rate may be compared to a pulse rate threshold to determine whether the user is in a state of excitement. The threshold may be adjusted based on pulse rates measured with the portable electronic equipment during earlier media recordings. The data captured by plural different second sensors may each be compared to a threshold, and the results of the threshold comparisons may be combined with each other using "AND" or "OR" logical operators. If the captured data does not fulfill the predetermined criterion, the method proceeds to 68. At 68, the recorded image is stored, but no metadata is stored.

If the captured data fulfills the predetermined criterion, the method proceeds to 64. At 64, metadata are generated. At 65, the media file and associated metadata are stored. The method then returns to the monitoring at 61.

The metadata are personal information tagged to recorded media, such as images or videos. The metadata may be used to group together different media items which were recorded at different times, but have similar personal information tagged to them. Organizing media in accordance with the associated metadata may be performed locally at the portable electronic equipment or at a device to which the media file and associated metadata was sent. Different rules may be used by different devices to respectively organize media in accordance with metadata. To organize media data locally at the portable electronic equipment, the processing device 4 may retrieve the metadata associated with recorded media and may use the metadata to group together media items, or to perform a search in media using the user's physical condition as a search criterion.

Figure 7:
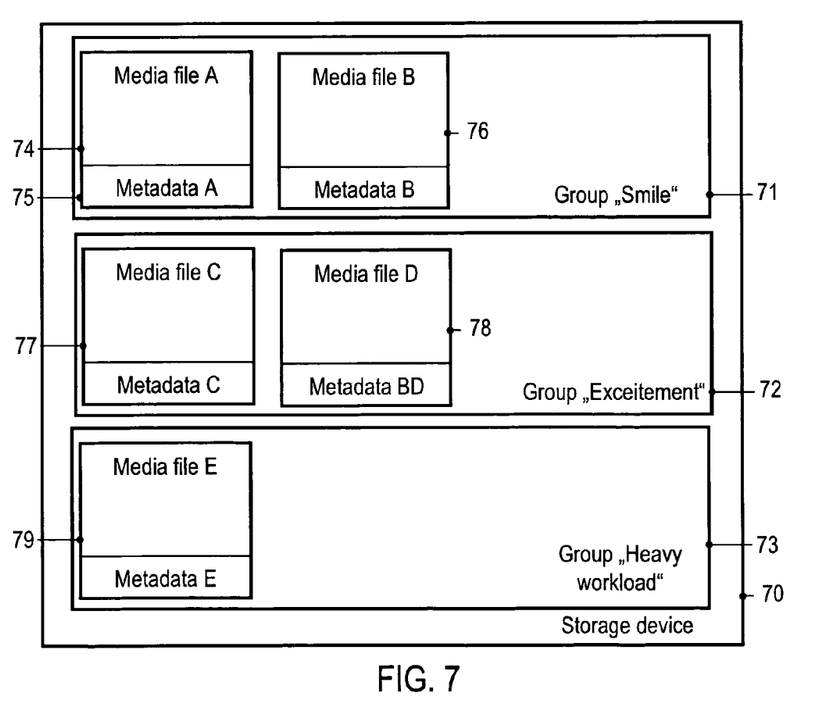
FIG. 7 is a schematic view of media organized according to personal sensor information according to an embodiment.

FIG. 7 schematically illustrates a storage device 70 in which media items are grouped into a plurality of groups 71-73 in accordance with the associated metadata. The media items do not need to be grouped together physically on the storage device. The grouping may be implemented at a logical level. For illustration, the grouping of media items in accordance with the personal data tagged thereto may be performed to organize media for outputting to a user via the display of the portable electronic equipment.

The group 71 of media items is associated with a smiling facial expression. Group 71 includes two media files 74, 76. The group 71 may further include the metadata associated with the media files 74, 76. The media files 74, 76 are assigned to the group 71 based on whether a smile is detected in a video captured using the second image sensor 19.

The group 72 of media items is associated with excitement. The pulse rate may be indicative of the user's excitement when recording the media. Group 72 includes two media files 74, 76. The group 72 may further include the metadata associated with the media files 77, 78. The media files 77, 78 are assigned to the group 72 based on criteria which involve a pulse rate. For illustration, the media files 77, 78 are assigned to the group 72 if the pulse rate captured during image recording exceeds a threshold.

The group 73 of media items is associated with a state corresponding to heavy workload. The pulse rate and blood oxygen saturation, when evaluated in combination, may be indicative of such a state. Group 73 includes a media file 79. The group 73 may further include the metadata associated with the media file 79. The media file 79 is assigned to group 73 based on criteria which involve a first threshold comparison for a captured pulse rate and a second threshold comparison for a captured blood oxygen saturation, combined using a logical "AND". For illustration, the media file 79 may be assigned to the group 73 if the pulse rate captured during image recording exceeds a first threshold, and if the blood oxygen saturation is below a second threshold.

Metadata associated with a media file which has been recorded over an extended period of time, such as a video sequence, may be assigned to individual sections of the media file. Metadata may be associated with certain image frames of a video sequence. When metadata are selectively associated with individual image frames of a video sequence, the metadata can be used to readily identify sub-sequences of a video which caused a certain physical condition at the time of recording the video.

Other groups may be defined, depending on the second sensors that are available to capture data representing the physical condition of the user. It is also possible that one media item is included in plural groups if the associated metadata comply with the criteria for assigning the media item to a first group and a different second group.

The metadata indicative of the physical condition at the time of media recording may not only be used locally at the portable electronic equipment 1 which performs the media recording. The metadata may be transmitted, over the wireless communication interface 9, to a mobile communication network. Such transmission may be performed conditionally dependent on whether a user has actively confirmed that he or she is willing to transmit the personal sensor information tagged to recorded media to the mobile communication network. In the mobile communication network, a server may perform process transmitted media files based on the metadata associated with the media files. For illustration, in a social network, the metadata indicative of the physical condition of the respective user during media recording may be used to organize media items into groups, to search in media items, or similar. Other devices may group media in accordance with the associated metadata. For illustration, media and associated metadata may be transmitted from the portable electronic equipment to another portable electronic, and may be organized at the other portable electronic equipment in accordance with the associated metadata. Different devices may use different criteria to organize media into plural groups.

Figure 8:
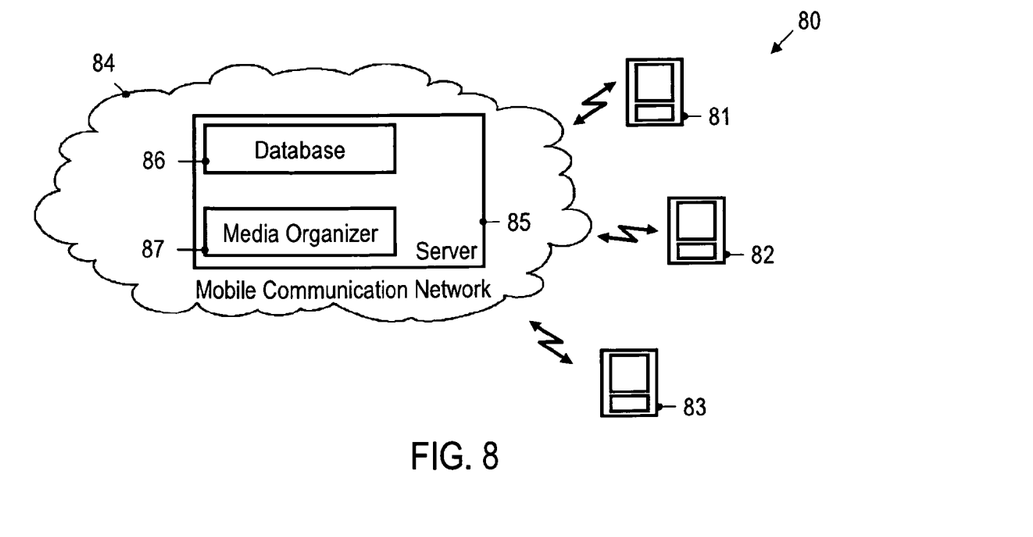
FIG. 8 is a schematic view of a communication system according to an embodiment.

FIG. 8 is a schematic view of a communication system 80. In the communication system 80, portable electronic equipments 81-83 communicate with a server 85 to share media and, optionally, metadata indicative of the physical condition at the time of recording the media. The portable electronic equipments 81-83 communicate with a wireless mobile communication network 84 to transmit messages to or receive messages from the server 85. The server 85 may be included in a core network of the mobile communication network 84, or may otherwise be interfaced with a node of the mobile communication network 84. When one of the portable electronic equipments 81-83 is willing to share images and associated personal sensor information included in the metadata, it may transmit a message to the server 85 which contains the media and associated metadata.

The server 85 may have a database 86 storing images and associated personal sensor information. The database 86 may also include information defining, for plural portable electronic equipments, identities of contacts for sharing images and associated personal sensor information.

A media organizer module 87 executed on the server 85 may perform processing of media which is based on the metadata associated with the media. For illustration, in response to receiving a message including an image and associated personal sensor information from the portable electronic equipment 81, the server 85 may assign this image to at least one of plural groups, depending on the metadata associated with the image. The group is selected based on the physical condition of the user at the time of recording the media. At least some other users, such as the user of the portable electronic equipment 82, may access the group when the user of the portable electronic equipment 81 agrees to share information on his or her physical condition with the user of the portable electronic equipment 82.

Figure 9:
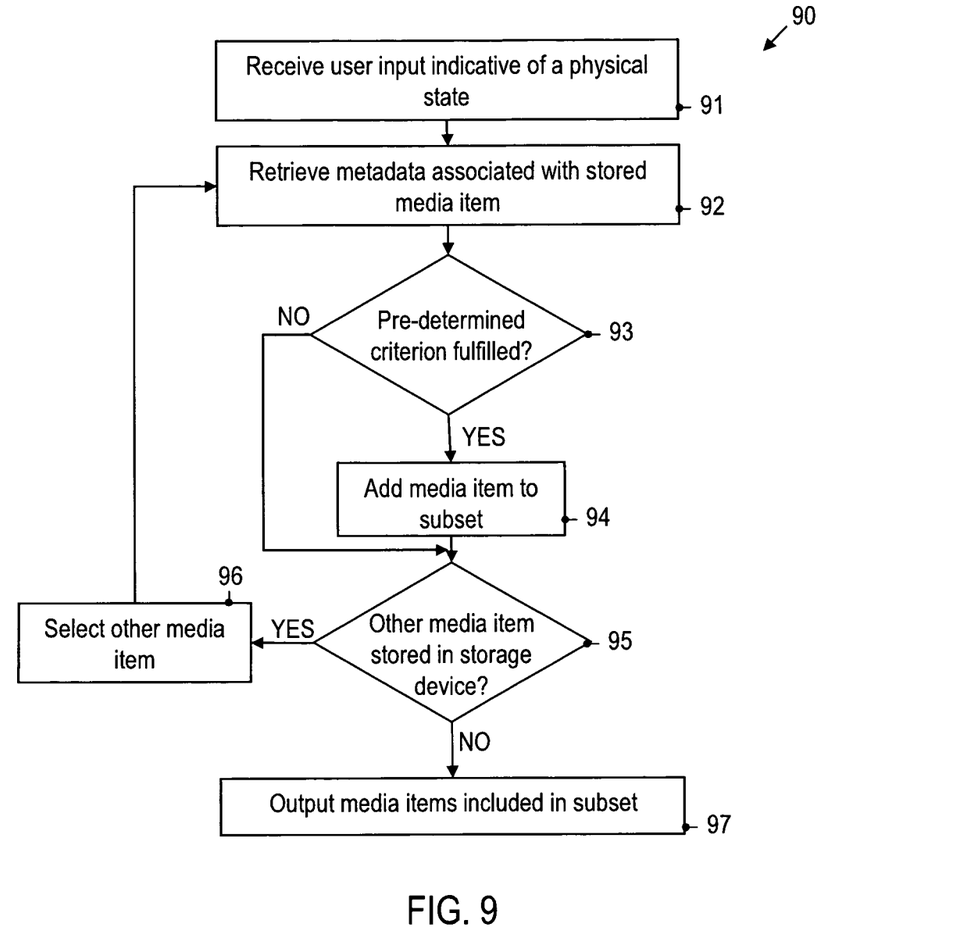
FIG. 9 is a flow chart of a method according to an embodiment.

FIG. 9 is a flow chart of a method 90 in which metadata associated with recorded media are used to organize media into groups or to perform a search in media. The method 90 may be performed by the portable electronic equipment 1 which was used to record the media and to capture the data representing the physical condition of the user. The method 90 may also be performed by a device distinct from the portable electronic equipment 1 which was used to record the media, e.g. by the server 85 of the communication system 80 of FIG. 8. There is a plurality of media items which respectively have associated metadata, which is used to organize the media items.

At 91, a user input is received which is indicative of a physical state. The user input may indicate at least one of a finite set of pre-defined physical states. Examples for such physical states include "smile", "high pulse rate", "high tension", "high effort", "high workload", or similar.

At 92, the metadata associated with a media item stored in a storage device is retrieved. Retrieving the metadata may include retrieving the metadata from a dedicated field of a media file or from a separate file which is associated with the media file in a one-to-one correspondence.

At 93, it is determined whether the metadata indicative of the user's physical condition fulfills a pre-determined criterion. The verification at 93 may involve at least one threshold comparison. If the metadata include data indicative of plural physical conditions, such as a pulse rate, a galvanic skin response, or a blood oxygen saturation, the verification may include logical operations. For this purpose, results of plural threshold comparisons may be supplied to a logical "AND" operator or a logical "OR" operator. This provides enhanced versatility in identifying physical states. For illustration, a pulse rate value and a blood oxygen saturation value contained in the metadata may be combined with each other to determine whether the user has been in a state of high effort, high tension, or high workload when the media was recorded.

The pre-determined criterion used for the verification at 93 may depend on the user input received at 91. For illustration, in order to determine whether the media item corresponds to a high pulse rate, the pulse rate in the metadata may be compared to a threshold. Other values which may be included in the metadata, such as the blood oxygen level, may be disregarded for this criterion. In order to determine whether the media item corresponds to a high effort state, it may be determined whether the pulse rate is greater than a first threshold and the blood oxygen saturation is below another threshold.

Depending on a result of the comparison, at 94 the media item is selectively added to a subset of media items. A media item is added to the subset if the associated metadata show that the user had the physical state specified by the user input at 91, at the time the media item was recorded.

At 95, it is determined whether there are other media items stored in the storage device. If there are other media items, the method proceeds to 96. At 96, another media item is selected. The method returns to 92, and steps 92 to 95 are repeated. In this process, media items are added to the subset if the associated metadata show that the user had the physical state specified by the user input at 91, at the time the media item was recorded.

If it is determined that the verification of 93 has been performed for all available media items, the method proceeds to 97. At 97, the media items included in the subset may be output to the user. The group which contains the media items for which the user had a certain physical state is returned to the user in response to the query input at 91.

Grouping of media based on metadata may be performed at various devices, e.g. at the portable electronic equipment or at a device remote from the portable electronic equipment. The criteria which are used for organizing media in accordance with the associated metadata may change over time. For illustration, the criteria may be adjusted based on user preferences, such as based on a user setting that may be activated by a dedicated user action. The criteria may also be changed based on machine learning from manual grouping performed by the respective user. To this end, the manner in which the user manually groups together media files may be monitored, and the associated metadata indicative of the physical condition may be correlated to automatically identify correlations between user-defined groups and the metadata associated with media in the groups. Thereby, rules for grouping together media files may be derived or adjusted taking into account the information derived by monitoring groups manually defined by the user and the associated metadata indicative of the physical condition. The criteria may also be changed based on machine learning from actions performed by plural users. For illustration, the manner in which plural different users respectively group media items may be monitored, and the associated metadata indicative of the physical condition of the respective user may be correlated with the groups defined by users. The criteria used for grouping may be adjusted according to machine learning from multiple users. An updated grouping criteria algorithm may be generated based on the manner in which multiple users respectively perform grouping of media. The updated grouping criteria algorithm may be generated at a server of a mobile communication network or of a wide area network. The updated grouping criteria algorithm may be used at a central entity, such as a server in the mobile communication network or in the wide area network, and/or may be deployed to a portable electronic device for local use in the portable electronic device.

While portable electronic equipments and methods of recording media have been described with reference to the drawings, modifications and alterations may be implemented in further embodiments. In the equipments and devices, the recorded media may be an image frame. The recorded media may also comprise a plurality of image frames that form a video. While embodiments have been described in the context of image recording, the equipments and methods may be applied to other kinds of media recording, such as video and/or audio recording.

For further illustration, while certain implementations of second sensors were described, other second sensors may be used alternatively or additionally. For illustration, the at least one second sensor may include blood pressure monitor, a thermometer, or other monitors, such as a cardiovascular sensor or a fitness sensor.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A portable electronic equipment, comprising:
   a first sensor comprising a first image sensor to record media, the media recorded by the first image sensor comprising an image frame or a video;
   at least one second sensor comprising a second image sensor to capture data representing a physical condition of a user of the portable electronic equipment, the second image sensor being different from the first image sensor, the data captured by the second image sensor comprising a body language of the user, the at least one second image sensor being configured to capture the data in response to the first sensor recording the media;

a processing device interfaced with the at least one second sensor, the processing device being configured to:
retrieve the data captured by the at least one second sensor, the retrieved data representing a second field of view disjoint from a first field of view of the first image sensor, wherein retrieval of the data representing the second field of view from the at least one second sensor is triggered by the first image sensor recording the media;
process the body language of the user captured by the second image sensor to derive a numerical value from the body language;
generate metadata for the recorded media based on the data, the metadata being indicative of the physical condition and comprising the numerical value derived from the body language; and
cause the metadata comprising the numerical value derived from the body language to be stored in association with the recorded media by writing the metadata into a media file that stores the recorded media or by generating separate files for the metadata and the recorded media in a manner which establishes a correspondence between the metadata and the recorded media.

2. The portable electronic equipment of claim 1,
the at least one second sensor being configured to capture the data while the first sensor simultaneously records the image frame or the video.

3. The portable electronic equipment of claim 1,
the processing device being configured to:
verify whether the captured data fulfill a pre-determined criterion, and
cause the metadata to be stored selectively based on whether the captured data fulfill the pre-determined criterion.

4. The portable electronic equipment of claim 3,
the pre-determined criterion comprising at least one threshold comparison.

5. The portable electronic equipment of claim 3,
the at least one second sensor being configured to capture first data representing a first physical condition and second data representing a second physical condition different from the first physical condition;
the processing device being configured to:
perform a first threshold comparison for the first data;
perform a second threshold comparison for the second data; and
selectively generate the metadata based on a result of both the first threshold comparison and the second threshold comparison.

6. The portable electronic equipment of claim 1, further comprising:
a storage device configured to store the recorded media and the metadata associated with the media;
the processing device being configured to process media stored in the storage device based on the metadata respectively associated with the media.

7. The portable electronic equipment of claim 6,
the processing device being configured to perform a search in the media stored in the storage device based on the metadata associated with the media.

8. The portable electronic equipment of claim 6,
the processing device being configured to organize the media stored in the storage device into plural groups based on the metadata associated with the media.

9. The portable electronic equipment of claim 6,
the metadata associated with the media comprising first metadata indicative of a first physical condition and second metadata indicative of a second physical condition different from the first physical condition,
the processing device being configured to process the media stored in the storage device based on both the first metadata and the second metadata respectively associated with the media.

10. The portable electronic equipment of claim 1,
the second image sensor being configured to capture the body language such that the body language comprises a facial expression of the user,
the processing device being configured to compute a curvature of a mouth of the user from the body language to derive the numerical value from the body language.

11. The portable electronic equipment of claim 1,
the first image sensor being configured to record the video comprising a plurality of image frames,
the at least one second sensor being configured to capture the data while the plurality of image frames is recorded.

12. The portable electronic equipment of claim 11,
the processing device being configured to cause the metadata to be stored selectively for a subset of the plurality of image frames of the video based on the data captured while the plurality of image frames are recorded.

13. The portable electronic equipment of claim 1, further comprising a wireless communication circuit interfacing the processing device with the second image sensor.

14. A method of recording media using a portable electronic equipment, the method comprising:
recording media which comprises an image frame or a video using a first image sensor having a first field of view;
capturing data representing a physical condition of a user of the portable electronic equipment, the data being captured when the media are recorded and comprising a body language of the user, the data representing a second field of view disjoint from the first field of view;
retrieving the data from at least one second image sensor for processing, retrieval of the data representing the second field of view from the at least one second sensor being triggered by the first image sensor recording the media;
processing the body language of the user to derive a numerical value from the body language;
generating metadata for the recorded media based on the captured data, the metadata being indicative of the physical condition and comprising the numerical value derived from the body language; and
storing the metadata in association with the recorded media by writing the metadata into a media file that stores the recorded media or by generating separate files for the metadata and the recorded media in a manner which establishes a correspondence between the metadata and the recorded media.

15. The method of claim 14, further comprising:
verifying whether the captured data fulfill a pre-determined criterion, and
causing the metadata to be stored selectively based on whether the captured data fulfill the pre-determined criterion.

16. The method of claim 15,
wherein capturing the data comprises:
- capturing first data representing a first physical condition, and
- capturing second data representing a second physical condition different from the first physical condition; and wherein generating the metadata comprises:
- performing a first threshold comparison for the first data;
- performing a second threshold comparison for the second data; and
- selectively generating the metadata based on a result of both the first threshold comparison and the second threshold comparison.

17. The method of claim 14, further comprising:
processing the stored media based on the metadata respectively associated with the media.

18. The method of claim 17, further comprising:
organizing the stored media into plural groups based on the metadata associated with the media.

19. The method of claim 17,
wherein the metadata associated with the media comprise first metadata indicative of a first physical condition and second metadata indicative of a second physical condition different from the first physical condition,
wherein processing the stored media comprises:
- processing the stored media based on both the first metadata associated with the media and the second metadata respectively associated with the media.

* * * * *